United States Patent
Feldstein et al.

(10) Patent No.: US 8,902,061 B2
(45) Date of Patent: *Dec. 2, 2014

(54) SYSTEMS AND METHODS FOR REMOTE BUILDING SECURITY AND AUTOMATION

(75) Inventors: Jeffrey Feldstein, Dunwoody, GA (US); Thomas Y. Cobb, Marietta, GA (US); Daniel George Jean, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,270

(22) Filed: Sep. 7, 2012

(65) Prior Publication Data

US 2013/0063265 A1  Mar. 14, 2013

Related U.S. Application Data

(63) Continuation of application No. 12/567,347, filed on Sep. 25, 2009, now Pat. No. 8,325,033.

(51) Int. Cl.
*G08B 1/08* (2006.01)

(52) U.S. Cl.
USPC ............... 340/539.14; 340/539.18; 340/506

(58) Field of Classification Search
USPC ............... 340/539.1, 539.11, 539.14, 539.18, 340/539.19, 539.25, 505, 506, 541; 348/154, E7.086; 726/5, 12
See application file for complete search history.

(56) References Cited

U.S. PATENT DOCUMENTS

| | | | |
|---|---|---|---|
| 5,237,408 A * | 8/1993 | Blum et al. | 348/154 |
| 7,437,755 B2 * | 10/2008 | Farino et al. | 726/5 |
| 7,554,445 B2 | 6/2009 | Script et al. | |
| 7,912,447 B2 | 3/2011 | Bennett et al. | |
| 7,956,735 B2 * | 6/2011 | Jackson | 340/506 |
| 8,325,033 B2 * | 12/2012 | Feldstein et al. | 340/539.14 |
| 8,334,763 B2 * | 12/2012 | Jackson | 340/506 |
| 2006/0154642 A1 | 7/2006 | Scannell | |
| 2006/0271695 A1 | 11/2006 | Lavian | |
| 2009/0243834 A1 | 10/2009 | Sennett et al. | |
| 2011/0248818 A1 * | 10/2011 | Hashim-Waris | 340/5.52 |

* cited by examiner

*Primary Examiner* — Van T. Trieu
(74) *Attorney, Agent, or Firm* — Scott P. Zimmerman, PLLC

(57) ABSTRACT

A system and method for remotely monitoring and controlling building security are provided. A controller is communicatively coupled to security devices of a building and can communicate an activity event detected by one of the security devices to a remote user device. The controller can then establish a communication session between the remote device and a security device via the controller, thereby allowing the user to communicate with any visitors. Video from a security device can be transmitted by the controller to the user device or an alternative user-device. Access instructions can be provided by the user, in response to which the controller can deactivate various building security measures. Security measures can be reactivated by the controller automatically or in response to a user command. Additionally, the controller can monitor visitor compliance with the deactivated security measures and activate alarms or notify security agencies if necessary.

20 Claims, 3 Drawing Sheets

SYSTEMS AND METHODS FOR REMOTE BUILDING SECURITY AND AUTOMATION

CROSS-REFERENCE TO RELATED APPLICATION

This application is a continuation of U.S. patent application Ser. No. 12/567,347 filed Sep. 25, 2009 and now issued as U.S. Pat. No. 8,325,033, which is incorporated by reference herein in its entirety.

FIELD OF THE DISCLOSURE

The present disclosure relates generally to building security, and more particularly to remote monitoring and control of building security systems.

BACKGROUND

Deliveries and service/repair visits frequently require a homeowner or building manager/supervisor (for simplicity, hereinafter referred to as a homeowner) to be present at the home or building. In many instances, the homeowner is merely required to open the door for the delivery and/or acknowledge the presence of the service personnel. Often, deliveries and service visits can only be scheduled during weekdays (i.e., normal business days), thus requiring homeowners to be physically present at the building. Homeowners must disrupt their usual schedule or neglect other things that need attention outside the home in order to wait at home for a delivery. This causes an increase in frustration and inconvenience of the homeowner as well as a decrease in worker productivity.

Various building security measures and entrance security devices are known. However, none adequately addresses the need for a homeowner to be physically present without unacceptably compromising the security of the home. For example, some homes/buildings are equipped with a keypad lock such that anyone that knows the correct combination can gain entry. Alternatively, some locks have a master key that allows entry into multiple homes. However, these security measures still require third-parties to be granted unfettered access to the entire building and risk the dissemination of the pass-code combination or copies of the master key to parties without authorization for entry. Alternative security systems include the use of security cameras and/or intercom systems. However, such existing solutions also require a user to be present at the home or building to interact with the security devices.

Additionally, security alarms can be operated with a timer to deactivate alarms during certain times. A user may be able to schedule deactivation of the alarm for the window during which the delivery or repair service is scheduled to arrive. Thus, a homeowner is not required to be present for the visitor. However, in accordance with this solution, the alarm is deactivate for all visitors for the scheduled time and thus creates an unacceptable risk.

SUMMARY

In accordance with an embodiment, a method and system for remotely monitoring and controlling building security is provided. Security monitoring devices, connected to a controller, can communicate an activity event (e.g., detection of a visitor) to the controller. The controller transmits an activity notification to a user's remote device. The controller can then establish a communication session between the remote device and a security communication device by establishing a first communication channel with the remote device and a second communication channel with the security-communication device, thereby allowing the user to communicate with the security communication device via the controller. Access instructions can then be provided to the controller (e.g., from the user or the user device), in response to which the controller can deactivate various building security measures.

In a further aspect of an embodiment, the controller can communicate with a remote video-capable user device to transmit video from one of the security monitoring devices. The remote video-capable device can be included in the first remote device or a separate device (e.g., a user computer). Additionally, the controller can establish another communication channel with the video capable device or, if possible, transmit the video data over the existing communication channel to the remote user device.

In yet a further aspect of an embodiment, security measures can be reactivated by the controller. In one embodiment, the user can remotely control the security measures by way of a command that is transmitted to the controller. Alternatively, the controller can automatically reactivate security measures after a period of time. Additionally, if necessary, either the user or the controller can alert a security agency.

These and other advantages of the invention will be apparent to those of ordinary skill in the art by reference to the following detailed description and the accompanying drawings.

DETAILED DESCRIPTION

By way of overview and introduction, and in accordance with an embodiment, a user can control and interact with various building or home security features from a remote device. For example, in one scenario, a homeowner may be expecting delivery of a package while at work. Rather than missing the delivery, the homeowner can configure a monitoring system, implemented in accordance with an embodiment, to notify the homeowner when someone rings the doorbell to the house. Additionally, the monitoring system can be configured to establish a communication channel with the user's remote device (e.g., a cellular telephone) and establish a communication channel with a security communication device in the home (e.g., an intercom at the front door), so as to enable the user to talk to and/or listen to whoever is at the door of the home. Optionally, the user can be provided with video or still pictures of the person at the door obtained by a security camera connected to the monitoring system. If the user determines that the visitor is the delivery person, the user can instruct the monitoring system to unlock the front door to allow the delivery person to leave the package inside the house. Once the delivery person leaves, the door can be re-locked by the monitoring system, either automatically or in response to a user-command. Additional aspects and features of various embodiments are described below with reference to the Figures.

Figure 1:
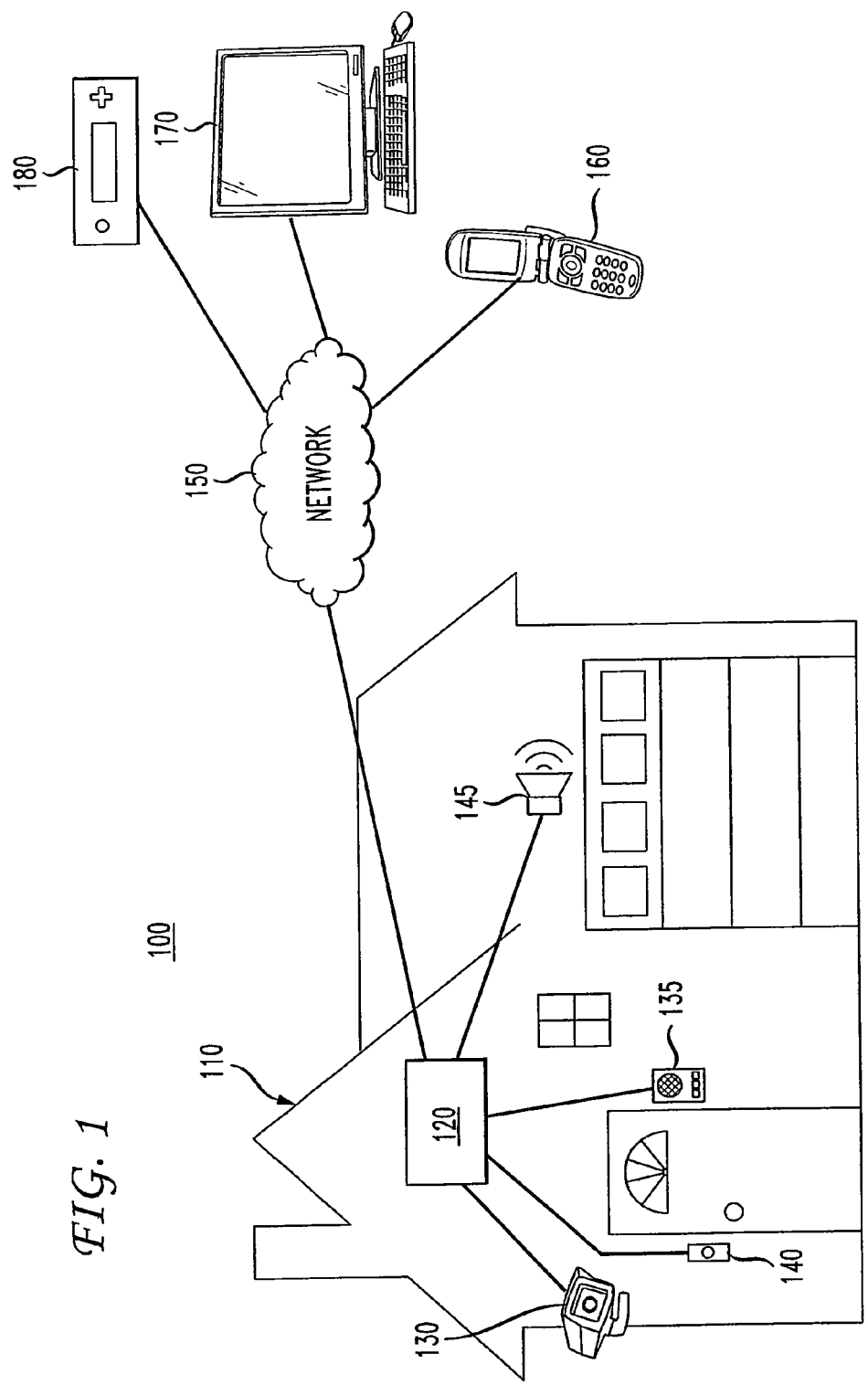
FIG. 1 illustrates an operational environment of a remote monitoring system in accordance with an embodiment.

FIG. 1 illustrates an operational environment 100 of the monitoring system in accordance with an embodiment. A building 110 is provided with various security devices including security communication devices and security monitoring devices. Security communication devices typically enable an authorized person(s) to communicate (e.g., audibly or visibly) with other parties (e.g., visitors, intruders, or other personnel) in and around the building. Security monitoring devices typically enable an authorized person(s) to interact with or monitor the status of the building being monitored (e.g., determine which doors or windows are open, view various camera displays, etc.). For example, the building 110 includes a motion detector 145 located by the garage and a security camera 130, an intercom 135 and a doorbell 140 near the front door. While illustrated as separate devices, a person of ordinary skill in the art would recognize that the security monitoring devices and security communication devices could be implemented in various combinations in an individual security device, such as a video-capable intercom 135 having a ringer (i.e., doorbell 140) or a motion sensor 145 that includes a camera 130.

Each of the security monitoring devices and security communication devices are preferably in network communication with controller 120. Communication between the monitoring devices and security communication devices can be provided through wired or wireless communication. In accordance with one embodiment, the controller 120 is capable of Ethernet (i.e., the IEEE 802.3 standard) and Wireless Ethernet (i.e., the IEEE 802.11x standard) communications. Thus, the intercom 135, doorbell 140, and camera 130 may be connected to the controller 120 through Ethernet cables, and the motion detector 145 can be provided with a wireless transceiver to wireless communicate with the controller 120. Wireless communication can be beneficial for adding security monitoring devices or security communication devices without requiring the installation of additional wiring in buildings. In a further alternative, the security monitoring devices and security communication devices can communicate over other known wired and wireless protocols.

While the controller 120 is illustrated in FIG. 1 as within the building 110 premises, in accordance with a further embodiment, the controller 120 can be located remotely, such as at a remote monitoring site associated with a contracted security service. If the security monitoring devices and security communication devices are capable of internet protocol (IP) communication, the security monitoring devices and security communication devices can be connected to a router within the building 110, or a network address translation (NAT) module which directs communications between the security monitoring devices and security communication devices and the remotely located controller 120. Alternatively, a simplified sub-controller can be located within the building 110 premises to communicate with the security monitoring devices and security communication devices using a known protocol, and translate or encapsulate those communications for transmission to the remotely located controller 120.

The controller 120 is preferably configured to communicate with remote devices over one or more wide area networks (e.g., the Internet, cellular telephone networks, etc.). FIG. 1 illustrates a single network 150 only for simplified exemplary purposes. A person of ordinary skill in the art would understand that the convergence of telephone networks and computer networks is rapidly enabling devices using one protocol to communicate with other devices using another protocol (e.g., cellular telephone 160 to internet communications). However, the controller 120 can include multiple interfaces to various networks. For example, the controller 120 can include an interface to a public switched telephone network (PSTN), a cellular telephone network, and/or an IP network. Therefore, as illustrated, the controller 120 can communication with a user's cellular telephone 160, a computer 170, a set-top box 180 (e.g., a cable television receiver), or other device.

Figure 2:
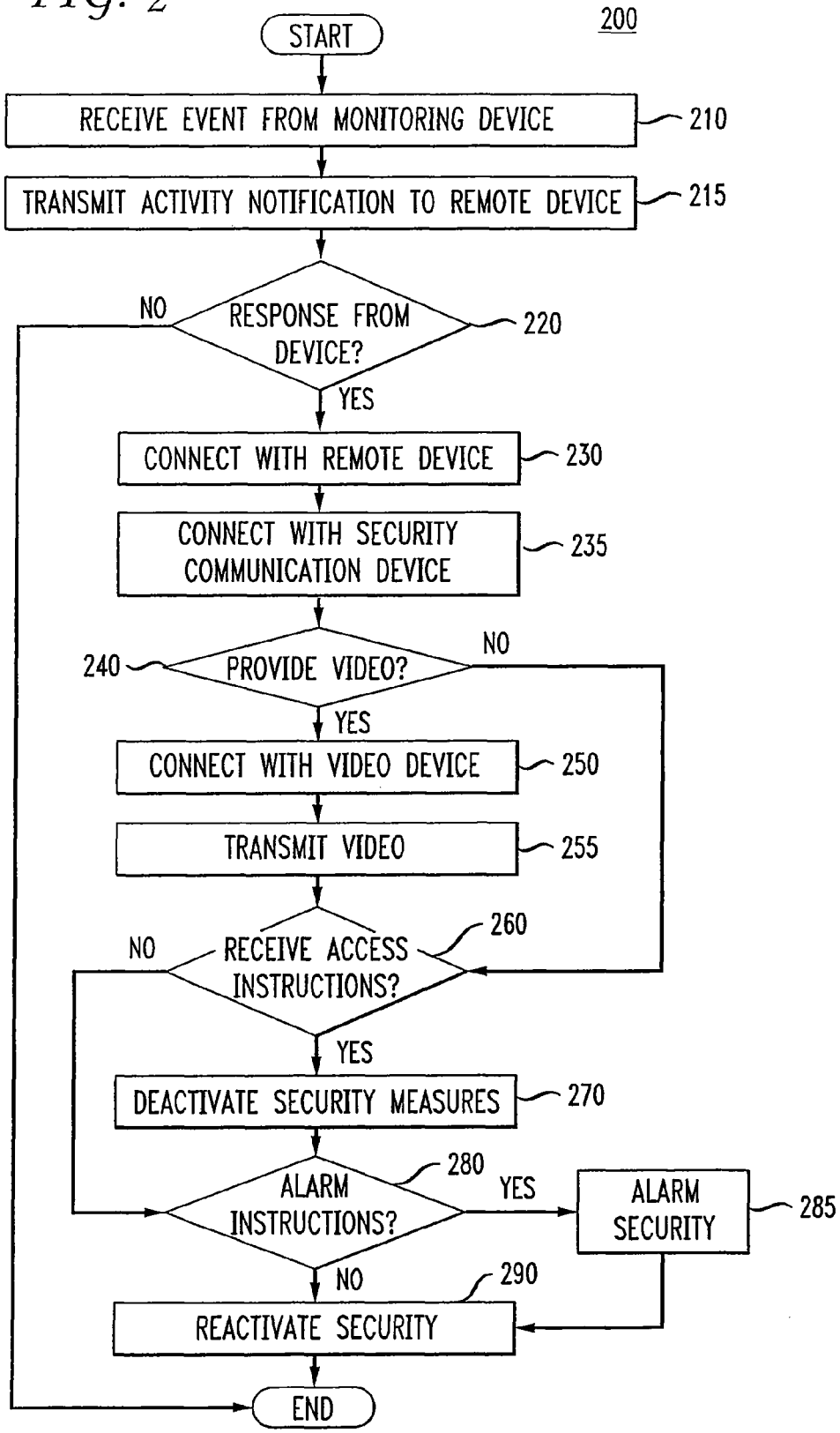
FIG. 2 is a flow diagram of a process in accordance with an embodiment.

FIG. 2 is a flow diagram of a process 200 in accordance with an embodiment that operates within the environment described above with respect to FIG. 1. Process 200 enables users to remotely monitor building security, interact with visitors, and remotely control various security aspects of the building 110. Additionally, based on the description and Figures contained herein, a person of ordinary skill in the art would understand that the process 200 can operate with a subset or superset (i.e., additional or multiples) of the security monitoring devices and security communication devices illustrated in FIG. 1, as well as a subset of superset of the remote user devices (i.e., computer 170, set top box 180, cellular telephone 160).

Accordingly, at step 210 of process 200, the controller 120 receives an event from one of the security monitoring devices. The event can include a network-based message or interrupt from one of the security monitoring devices in response to an external trigger, such as a detection of motion by the motion detector 145 or the press of the doorbell 140. The controller 120 can determine what type of event occurred and transmit an activity notification to a user's remote device at step 215. Optionally, the activity notification may include additional details about the event. For example, if the motion detector 145 detects motion, the controller 120 can instruct a nearby security camera 130 to record a still picture of video clip of the event cause. The picture or video clip can then be transmitted along with, or as part of, the event notification. In a further example, a set of computer instructions at the intercom 135, or at the controller 120 controlling the intercom 135, can request that a visitor state his or her name. The visitor's response is recorded and transmitted along with, or as part of, the event notification.

The remote device can include the user's cellular telephone 160, computer 170, set-top box 180, or other such device. The controller 120 can be configured to communicate with the various devices based on a user selection, a configuration file specifying which device to contact at predefined times (e.g., a type of find me follow me service), or by concurrently attempting to contact multiple devices. The controller 120 can communicate with each user device using an appropriate communication protocol and transmission medium. For example, if the controller 120 contacts the user's cellular telephone 160, the communications can be made via a telephone call or via a packet data service (e.g., GPRS or EDGE). If the activity notification is sent to the user's computer 170, communications can be sent over the Internet via an IP protocol.

The user can be provided with the option of responding to the activity notification. If the user is busy or does not recognize the optional accompanying audio or still image transmitted along with the activity notification, the user can simply ignore the activity notification. Thus, at decision 220, the controller 120 determines whether it has received a response from the user's remote device. If no response has been received, the process 200 ends.

However, if the user indicates, via the remote device, a desire to communicate with the visitor that prompted the activity notification, at step 220, the process 200 establishes communication between the remote device and one of the security communication devices. That is, the controller 120 establishes communication with the remote device over an appropriate communication channel (e.g., cellular telephone communication channel) at step 230 and establishes another communication path with a security communication device over an appropriate communication channel at step 235. Thus, the user can communicate with the visitor via the controller 120. Communication can be one-way or two-way in accordance with limitations of the security communication device or remote device.

At decision 240, the controller 120 determines whether video or still images (hereinafter referenced as images) can or should be transmitted to the user. The determination to transmit images can be based on one or more parameters. In one scenario, the user can instruct the controller 120 to begin transmission of the images, for example by visiting a particular uniform resource locator (URL) address on a computer web browser, interacting with a software program on the user's computer 170 or cellular telephone 160, sending a text message (e.g., Short Message Service (SMS)), voice command, or pressing a specific sequence of telephone keys to produce a predetermined sequence of dual-tone multi frequency (DTMF) tones. Alternatively, the user can be prompted by the controller 120 whether to transmit images and to where to transmit them. In a further alternative, the controller 120 can automate the decision by gathering information about the capabilities of the user's remote device and the configuration of the security monitoring devices and by transmitting images to the user's remote device if image data is available from the security system and capable of displaying on the user's remote device.

Images can be transmitted to a cellular telephone 160 preferably via data link, to a computer 170 via an IP-based link, or to a set-top box 180. Additionally, images can be transmitted to the same device to which the controller 120 sent the activity notification or to an additional remote user device. For example, if the controller 120 calls the user on a cellular telephone 160 to notify the user of the activity, the controller 120 can also transmit the images to the cellular telephone 160 or open the second communication channel with a computer 170 and transmit the images to the computer 170 while optionally maintaining the connection with the user's cellular telephone 160.

If the controller 120 determines that images should be transmitted at step 240, at step 250 the controller 120 connects with the video device and transmits images at step 255. As described above, connecting to the video device at step 250 can merely include signaling the remote device over an already-existing communication channel that image transmission will begin. Alternatively, connecting to the video device can require establishing a second communication channel between the controller 120 and a remote device. The second communication channel can be over the same transmission medium as the existing communication channel or a different transmission medium.

The process 200 can also continue without transmission of images. Thus, if at decision 240, the controller 120 determines images should not be transmitted, the process 200 proceeds to step 260.

By way of the audio and/or image communication established between the security monitoring devices of the building 110 and the remote user devices, the homeowner, or other responsible party, can determine whether the visitor should be provided access to the building 110. For example, if the visitor is a delivery person, the homeowner may want to grant the visitor access for the building 110 for a limited period of time (e.g., enough time to deliver the package). In a further example, the homeowner may recognize the visitor as their teenage child who forgot his or her keys to the home. In either of the above scenarios, the remote user may instruct the controller 120 to allow the visitor access to the building 110.

At step 260, the controller 120 determines whether access instructions have been received from the remote user. Access instructions can be received in a variety of the ways such as those described above with respect to step 240 and receiving instructions to provide video. That is, instructions can be provided by signaling through a computer application, DTMF tones, SMS, or voice command.

Access instructions typically specify deactivation of certain security features of the building 110. For example, access instructions may specify that the controller 120 disable the building 110 alarm and unlock the front door at step 270. More detailed instructions may also be supported such that specific alarms and locks can be deactivated. For example, the user can specify that only the front door alarm be deactivated. Additionally, access instructions may specify a period of time over which the alarm is deactivated and/or the door unlocked. Thus, if after being granted access the visitor lingers inside the building 110 too long, the alarm will be automatically reactivated and potentially sound.

At step 280, the controller 120 can determine whether alarm instructions have been received. As discussed above with respect to access instructions and video instructions, alarm instructions can be provided by signaling through a computer application, DTMF tones, SMS, or voice command. Additionally, alarm instructions can be generated automatically by the controller 120. For example, in the example discussed above in which the visitor lingers beyond the specified period of time during which the alarm was disabled, the controller 120 may automatically generate alarm instructions that are performed by the controller 120 at step 285 so as to alert security (e.g., a security monitoring company or the or police) and optionally sound an audible alarm. Additionally, if the user is no longer monitoring the visitor's access to the building 110 (e.g., the user granted access and ended the communication from the controller 120), the controller 120 can notify the user that the visitor has violated the access granted by the access instructions and further inform the user of whatever other security measures (e.g., alarm and/or police call) are being taken.

It should be noted that alarm instructions can be received regardless of whether access instructions were received or provided. Thus, if a remote user is notified at step 215 of certain activity, and the user determines, based on the images transmitted along with the activity notification, that the activity is ill intentioned, the user can remotely activate alarms at step 285 including an audible alarm and an interactive or automated call to the police or security company.

At step 290, if alarm instructions have not been received or as part of the alarm instruction process, security measures can be reactivated. The user can manually instruct the controller 120 to reactivate security measures or the security measures may be reactivated automatically after a configurable elapsed time. Thus, the security system continues to monitor the various monitoring devices.

Figure 3:
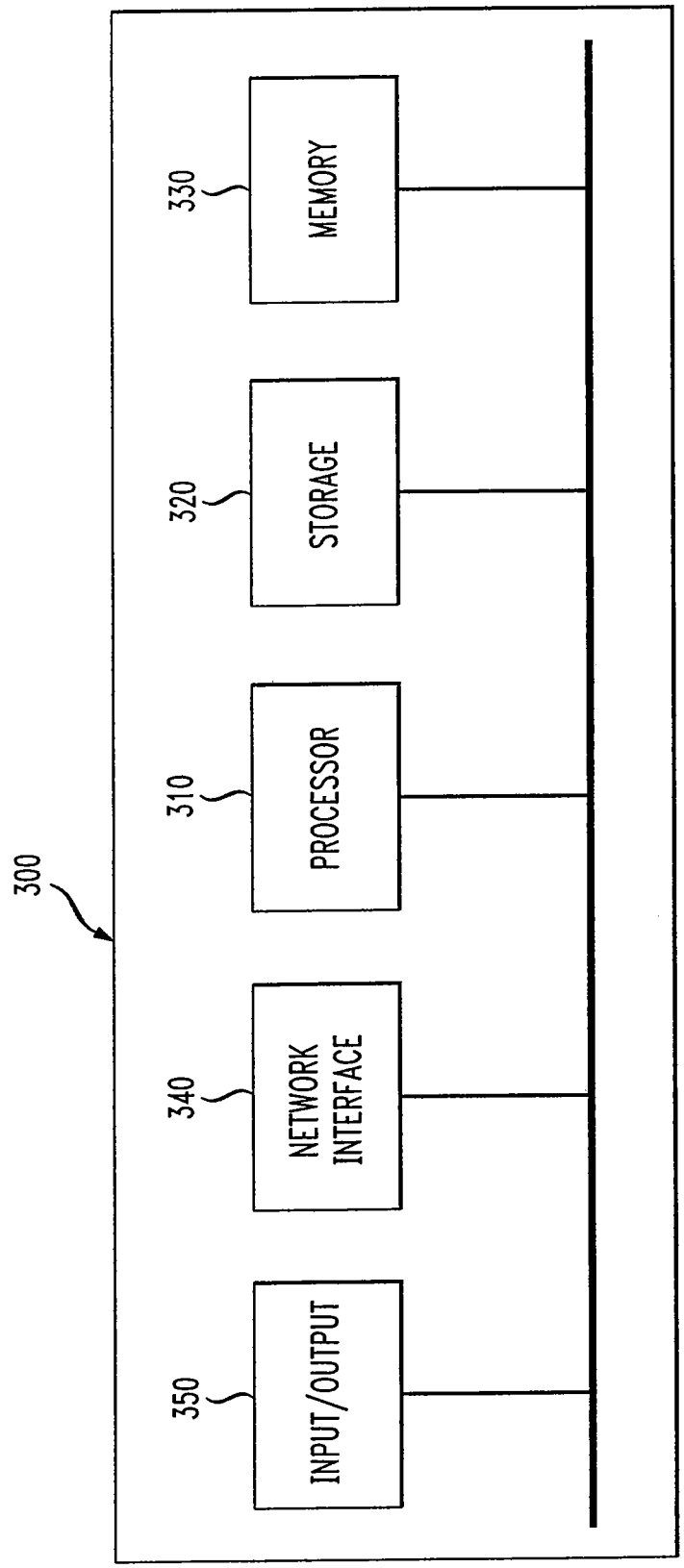
FIG. 3 is a high-level block diagram of a computer in accordance with an embodiment.

The above-described methods for providing building security can be implemented on a computer using well-known computer processors, memory units, storage devices, computer software, and other components. A high-level block diagram of such a computer is illustrated in FIG. 3. Computer 300 contains a processor 310 which controls the overall operation of the computer 300 by executing computer program instructions which define such operations. Controller 120 can be implemented using a computer as described herein. The computer program instructions may be stored in a storage device 320, or other computer readable medium (e.g., magnetic disk, CD ROM, etc.), and loaded into memory 330 when execution of the computer program instructions is desired. Thus, the method steps of FIG. 2 and/or operations of controller 120 of FIG. 1 can be defined by the computer program instructions stored in the memory 330 and/or storage 320 and controlled by the processor 310 executing the computer program instructions. For example, the computer program instructions can be implemented as computer executable code programmed by one skilled in the art to perform an algorithm defined by the method steps of FIG. 2. Accordingly, by executing the computer program instructions, the processor 310 executes an algorithm defined by the method steps of FIG. 2. The computer 300 also includes one or more network/communication interfaces 340 for communicating with other devices via a network 150. The computer 300 also includes input/output devices 350 that enable user interaction with the computer 300 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the embodiments, and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

We claim:

1. A method for providing security, comprising:
   sending, from a controller of a security system, an activity notification addressed to a remote client device associated with a user;
   receiving, at the controller, access instructions from the remote client device in response to the activity notification;
   determining, by the controller, a violation of the access instructions; and
   sending, from the controller, a notification of the violation of the access instructions addressed to the remote client device, the notification indicating that a visitor has violated access granted by the access instructions.

2. The method of claim 1, further comprising:
   establishing a first communication with the remote client device over a first communication channel; and
   establishing a second communication with a security-communication device over a second communication channel so as to enable communication between the security-communication device and the remote client device, wherein the access instructions from the remote client device are received over the first communication channel.

3. The method of claim 1, further comprising receiving a deactivation command to deactivate a security measure in response to the access instructions.

4. The method of claim 3, further comprising reactivating the security measure after a period of time.

5. The method of claim 3, further comprising reactivating the security measure in response to a command from the remote client device.

6. The method of claim 1, further comprising alerting a security agency.

7. The method of claim 1, further comprising receiving an activity indication from a monitoring device, wherein the activity notification is sent in response to receiving the activity indication.

8. A controller for a security system, comprising:
   a processor; and
   a memory storing instructions that when executed cause the processor to perform operations, the operations comprising:
   receiving an event detected by a monitoring device of the security system;
   sending an activity notification to an address of a remote client device in response to the event;
   receiving access instructions from the remote client device in response to the activity notification, the access instructions permitting access to a visitor;
   deactivating a security feature in response to the access instructions;
   determining a violation of the access instructions; and
   sending a violation notification to the address of the remote client device in response to the violation, the violation notification indicating that the visitor has violated the access granted by the access instructions.

9. The controller of claim 8, wherein the operations further comprise:
   establishing a first communication with the remote client device over a first communication channel; and
   establishing a second communication with a security-communication device over a second communication channel so as to enable communication between the security-communication device and the remote client device, wherein the access instructions from the remote client device are received over the first communication channel.

10. The controller of claim 8, wherein the operations further comprise sending a deactivation command in response to the access instructions.

11. The controller of claim 8, wherein the operations further comprise reactivating the security feature after a period of time.

12. The controller of claim 8, wherein the operations further comprise reactivating the security feature in response to a command from the remote client device.

13. The controller of claim 8, wherein the operations further comprise alerting a security agency.

14. The controller of claim 8, wherein the operations further comprise sending video data to the address of the remote client device.

15. A memory storing instructions for providing security, which, when executed by a processor, cause the processor to perform operations, the operations comprising:
   receiving an event detected by a monitoring device of a security system;
   sending an activity notification to an address of a remote client device in response to the event;
   receiving access instructions from the remote client device in response to the activity notification, the access instructions instructing the security system to grant access to a visitor;
   deactivating a security feature of the security system in response to the access instructions;
   determining a violation of the access instructions; and
   sending a notification to the address of the remote client device indicating that the visitor has violated the access granted by the access instructions.

16. The memory of claim 15, wherein the operations further comprise:
- establishing a first communication with the remote client device over a first communication channel; and
- establishing a second communication with a security-communication device over a second communication channel so as to enable communication between the security-communication device and the remote client device, wherein the access instructions from the remote client device are received over the first communication channel.

17. The memory of claim 15, wherein the operations further comprise sending a deactivation command in response to the access instructions.

18. The memory of claim 15, wherein the operations further comprise reactivating the security feature after a period of time.

19. The memory of claim 15, wherein the operations further comprise reactivating the security measure in response to a command from the remote client device.

20. The memory of claim 15, wherein the operations further comprise sending video data to the remote client device.

\* \* \* \* \*